E. H. STRAUSS.
FRICTION AND INERTIA COUNTERACTING DEVICE FOR SCALES.
APPLICATION FILED AUG. 29, 1904.
939,347. Patented Nov. 9, 1909.
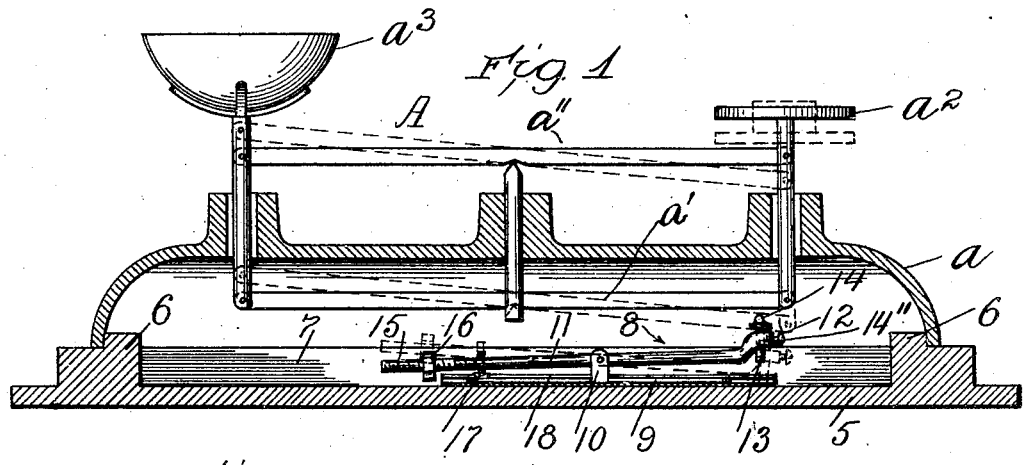
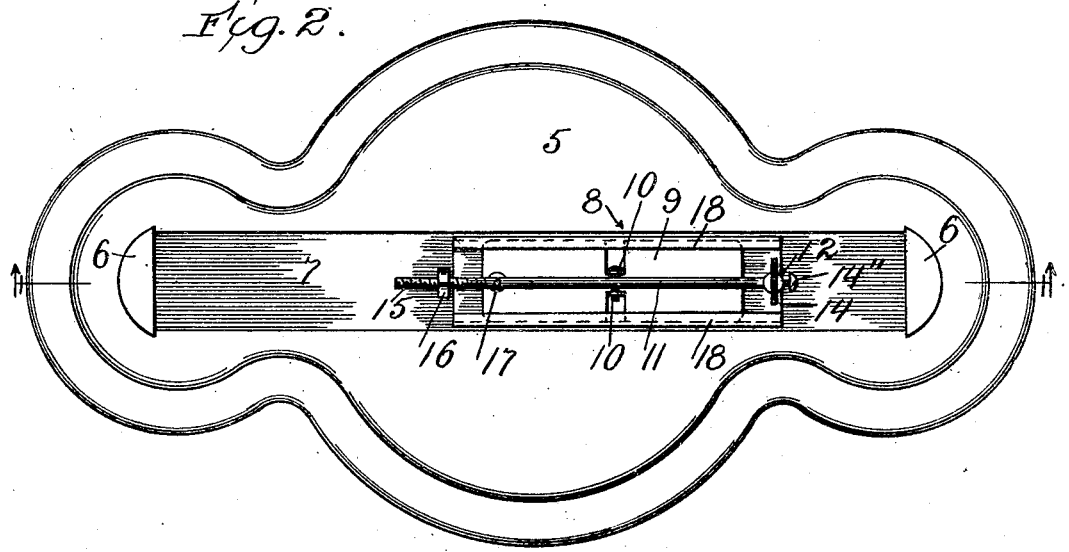
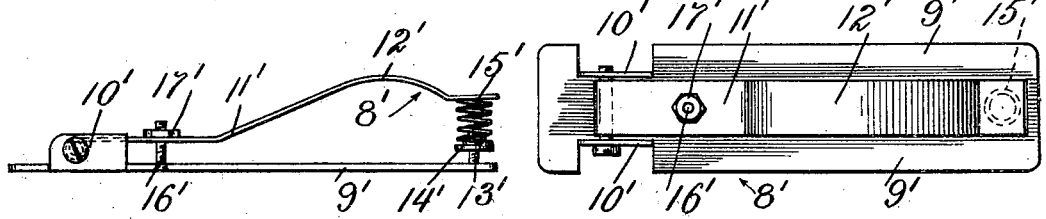
Witnesses:
Ray White
Harry P. L. White
Inventor
Ernest H. Strauss
By Forée Bain, Atty.

UNITED STATES PATENT OFFICE.

ERNEST HUGO STRAUSS, OF CHICAGO, ILLINOIS, ASSIGNOR TO AMERICAN COMMERCE & SPECIALTY CO., OF CHICAGO, ILLINOIS, A CORPORATION OF MAINE.

FRICTION AND INERTIA COUNTERACTING DEVICE FOR SCALES.

939,347.  Specification of Letters Patent.  Patented Nov. 9, 1909.

Application filed August 29, 1904. Serial No. 222,532.

*To all whom it may concern:*

Be it known that I, ERNEST HUGO STRAUSS, of Chicago, in the county of Cook and State of Illinois, have invented certain new and useful Improvements in Friction and Inertia Counteracting Devices for Scales; and I hereby declare that the following is a full, clear, and exact description thereof, reference being had to the accompanying drawings, which form part of this specification.

My invention relates to improvements in friction and inertia counteracting devices for beam scales.

It is a well known fact that in using the ordinary beam scales for commercial purposes, a merchant is subject to constant loss by reason of the fact that a weight being placed on one pan of the scale and the scale beam thrown from its normal or level position, an exact equivalent of the weight in merchandise placed in the opposite pan will not restore the scale to balanced position, but an over-weight must be added on the merchandise pan to overcome the scale beam's inertia and frictional resistance to the movement. This over-weight is ordinally permitted by merchants to remain in the scoop of material being sold, to avoid the impression of close dealing that the customer would obtain were the overweight then removed.

The primary object of my invention is to provide a device for association with scales which will counteract the inertia and frictional resistance above mentioned, and insure that the scale be brought to balance when the merchandise receiving pan is weighted with goods to exact equality with the weight upon the weight pan, thereby enabling the merchant to weigh closely without the appearance of stinginess.

A further object of my invention is to provide a device of the character described which is not attached to the scale and which, when coöperating with the scale, is entirely concealed from the purchaser. And a yet further object of my invention is to provide a device of the character described which is simple in construction and efficient in operation, and which is susceptible of very delicate adjustment in many respects.

With a view to attaining these and other objects, which will become apparent to those skilled in the art from the following description and the appended claims, my invention consists in the features of construction and arrangement of parts hereinafter more fully described and specified in the claims.

In the drawings; Figure 1 is a central, longitudinal section of a device embodying my invention, showing it in operative association to a convenient form of scale. Fig. 2 is a plan view of one form of my complete device. Fig. 3 is a side elevation of a modified form of tension device embodying features of my invention. Fig. 4 is a plan view of the device shown in Fig. 3.

Throughout the drawings like characters of reference refer always to like parts.

Referring now to Fig. 1, A indicates in general a scale of well known construction comprising a hollow base $a$, a movable element or lever $a'$ within the base, a parallel exterior lever $a$ and the weight pan $a^2$ and the merchandise scoop $a^3$ operatively connected with the levers $a'$ and $a$.

Certain of the features of my invention, it will be apparent to those skilled in the art, are adaptable to any style of scale, but the construction specifically shown in Figs. 1 and 2 is particularly adapted for scales having hollow bases in which are located movable elements forming part of the poise mechanism.

5 indicates a stand for the scale which may be of any suitable construction but is preferably provided with positioning blocks 6—6 arranged to hold the scale in definite relation to the stand, and is preferably provided with a longitudinal recess 7, of suitable depth.

8 indicates as a whole a tension device the form of which, shown in Fig. 1, I will now describe.

9 indicates a carrying plate provided with upturned ears 10—10 between which is pivoted a lever rod 11 which constitutes the prime movable member of the device. The lever rod and its appurtenances are so arranged that when the said rod is moved from normal position, it exerts a tendency to return to such position, and the rod is, in use, so associated with the lever $a'$ of the scale, that when said lever $a'$ is in normal position the tension device exerts no effect thereon, but that when the said lever $a'$ is tilted by a weight placed upon the weight pan, it acts upon the tension lever-rod to move it from its normal position so that it exerts a restoring tension upon the scale lever.

The normally elevated, or front end of the lever-rod 11, is preferably provided with a head 12 through which is threaded a vertical stem 13 provided at its upper extremity with a cross piece 14 adapted when in normal position to lie exactly below the scale-lever $a'$, and preferably out of contact therewith when the scale lever $a'$ is in horizontal or true balanced position. It will be apparent that the stem 13 may be vertically adjusted to suit the height of any lever $a'$.

14'' is a set screw taking through the head 12 to secure the stem 13 in adjusted position. The remote end of the lever 11 overbalances the front end thereof just described, so that when the front end is depressed a tension is exerted tending to restore it to normal or elevated position. I prefer, however, that the inherent tension be adjustable and to this end I screw-thread the rear end of the rod 11, as shown at 15, and mount thereon for longitudinal adjustment a weight 16 preferably in the form of a nut. I also provide means for adjusting the normal inclination of the rod 11 to the horizontal. 17 indicates an adjustable screw, threaded through the rod 11, and projecting below the rod 11, to serve as a stop to limit the downward movement of the rear end of said rod.

It will be apparent that by adjustment of the screw 17 the position of the head 14, relative to the scale, may be varied. It will further be seen that by properly adjusting the screw 17 or both the screw 17 and the stem 13 the maximum range of movement of the rod 11 may be varied.

I preferably mount the entire tension device 8 for longitudinal movement relative to the scale beam $a'$, and to this end I provide at the bottom of the recess 7 a suitable guide-way for the carrier plate 9, said guide-way being preferably formed by metallic strips 18 bent to overlie and guide the edges of the carrier plate 9.

It will be apparent now that the adjustment of the nut 16 effects the inherent tension of the tension device, while the adjustment of the tension device bodily longitudinally of the slot varies its effective action on the scale beam at any given inherent tension, so that by proper manipulation of the adjustable parts the tension device may be nicely suited to the requirement of either very delicate or coarser scales, and made to act upon the scale-lever with any desired tension, within certain limits.

In Figs. 3 and 4 I have illustrated a modified form of tension device embodying my invention, said device being indicated as a whole by the numeral 8'. In said figures 9' indicates a base plate having upturned ears 10' between which is pivoted a lever member 11', preferably a flat metal strip bent to present intermediate its ends an elevated portion 12' for contact with the scale beam $a'$.

13' indicates a screw-threaded stud mounted in vertical position at the forward end of the plate 9' and carrying a threaded washer 14' between which and the lever 11' is mounted a coiled spring 15' exerting its tension to maintain the lever 11' in elevated position. It will be apparent that by adjustment of the washer 14' the inherent tension of the device may be increased or decreased in accordance with the compression put upon the spring 15'.

16' indicates a screw-threaded stud projecting from the plate 9' and passing through the lever 11', said stud carrying at its upper end an adjustable nut 17' against which the lever 11' bears, and by the adjustment of which the maximum elevation of the lever 11' is determined.

It will be apparent that by adjustment of the parts 14' and 17' in the modified form of tension device, substantially the same effect may be attained as by the adjustment of the parts 16 and 17 of the weight-actuated tension device shown in Figs. 1 and 2.

It will further be apparent that the plate 9' may be inserted in the guides 18 of the stand so that the modified form of tension device will have the same adjustment longitudinally of the scale beam as the first-described form of tension device.

While I have herein described for purposes of a full disclosure of my invention, two operative embodiments thereof, I do not desire to be understood as limiting myself to the specific details of such constructions further than as specified in the claims, as it will be apparent that structural changes might be made without departure from the spirit and scope of my invention.

Having thus described my invention, what I claim as new and desire to secure by Letters Patent is:

1. In combination with a scale having a hollow base and a movable scale element within the base, a self-contained tension device arranged within the scale base to be concealed thereby and associated with said movable scale element to normally exert no effect thereon and to exert a restoring tension on said element when the latter is moved to unbalanced position.

2. As an article of manufacture, a self-contained tension device for scales adapted for association with a movable scale part to oppose the action of the counterpoise through a portion of the movement of said scale part, comprising a carrying plate, a movable member constructed and adapted to be set beneath the hollow base of the scale for concealment thereby, and said movable member being movable within certain limits only to be put under tension, and adjusting means for varying one limit of movement of said member.

3. The combination with a scale having a hollow base and a movable lever within the base, of a self contained tension device arranged within the scale's base to be concealed thereby, and associated with said scale lever to normally exert no effect thereon, and to exert a restoring tension upon said lever when the latter is moved to unbalanced position, said tension device being adjustable toward and from the scale lever fulcrum to vary its effect upon said lever.

4. The combination with a scale having a hollow base and a movable scale-element within the base, of a stand on which the scale-base rests, and a tension device carried by the stand arranged to be concealed by the scale-base, and associated with the movable scale-element to normally exert no effect thereon and to exert a restoring tension on said element when the latter is moved to one unbalanced position.

5. In combination with a scale having a hollow base and a movable lever-element within the base, a stand on which the scale-base rests, and a tension device carried by said stand and adjustable longitudinally thereof, said tension device being arranged to be concealed by the scale-base and associated with the movable scale-element to normally exert no effect thereon and to exert a restoring tension thereon when the scale-element is moved to one unbalanced position.

6. In combination, a stand adapted to receive a hollow-based scale, and a scale-restoring tension device carried by said stand adapted for coaction with a movable scale element to restore it toward balanced position when the element is overbalanced by the weighing weight.

7. In combination, a stand adapted to receive a hollow based scale, and a tension device, adapted for association with a movable scale part to yieldingly oppose the depression of the counterpoise, carried by the stand, said tension device being adapted to be concealed within the hollow scale base and comprising a pivoted lever and an adjustable weight mounted on said lever.

8. In a device of the character described, a movable member, a stand having a recess therein, an adjustable tension device mounted in the recess in the stand adapted for coaction with the lower lever of a hollow base scale, to exert a tension thereon opposing the action of the counterpoise and arranged to be concealed by the scale base and adjusting means for varying the limit of movement of said movable member.

9. In combination, a stand adapted to receive a hollow base scale and a tension device carried by said stand adapted to be concealed within the scale base, said tension device comprising a support, a lever 11 pivoted in said support, a weight on said lever on one side of the pivotal point, and an upright stem 13 adjustably mounted on the other end of said lever.

In testimony that I claim the foregoing as my own, I affix my signature in presence of two witnesses.

ERNEST HUGO STRAUSS.

In presence of—
GEORGE T. MAY, Jr.,
MARY F. ALLEN.